(12) United States Patent
Yajima et al.

(10) Patent No.: US 10,298,578 B2
(45) Date of Patent: May 21, 2019

(54) COMMUNICATION RELAY DEVICE, COMMUNICATION NETWORK, AND COMMUNICATION RELAY METHOD

(71) Applicant: FUJITSU LIMITED, Kawasaki-shi, Kanagawa (JP)

(72) Inventors: Jun Yajima, Kawasaki (JP); Takayuki Hasebe, Kawasaki (JP); Yasuhiko Abe, Niiza (JP)

(73) Assignee: FUJITSU LIMITED, Kawasaki (JP)

(*) Notice: Subject to any disclaimer, the term of this patent is extended or adjusted under 35 U.S.C. 154(b) by 221 days.

(21) Appl. No.: 15/194,793

(22) Filed: Jun. 28, 2016

(65) Prior Publication Data
US 2017/0026373 A1    Jan. 26, 2017

(30) Foreign Application Priority Data
Jul. 24, 2015 (JP) ................................. 2015-146621

(51) Int. Cl.
*H04W 12/12* (2009.01)
*H04L 29/06* (2006.01)
(Continued)

(52) U.S. Cl.
CPC .......... *H04L 63/0884* (2013.01); *G06F 21/00* (2013.01); *H04L 9/3226* (2013.01);
(Continued)

(58) Field of Classification Search
CPC ..... G06F 21/00; H04L 9/3226; H04L 9/3271; H04L 63/0869; H04L 63/0876; H04W 4/046; H04W 12/06; H04W 12/12
(Continued)

(56) References Cited

U.S. PATENT DOCUMENTS

| 2008/0070577 A1* | 3/2008 | Narayanan | ............ H04L 63/062 455/436 |
| 2008/0102798 A1* | 5/2008 | Fujimoto | ................ H04L 63/06 455/411 |

(Continued)

FOREIGN PATENT DOCUMENTS

| JP | 2012-178035 | 9/2012 |
| JP | 2015-005825 | 1/2015 |

(Continued)

OTHER PUBLICATIONS

Masato Hata et al., "How to Stop Unauthorized Transmission in Controller Area Network", Computer Security Symposium 2011, Oct. 19-21, 2011, pp. 624-629 (6 pages), with English Abstract.

*Primary Examiner* — Michael Pyzocha
*Assistant Examiner* — Zoha Piyadehghibi Tafaghodi
(74) *Attorney, Agent, or Firm* — Fujitsu Patent Center

(57) ABSTRACT

A communication relay device that is situated between a corresponding communication node and a bus in a communication network in which a plurality of communication nodes mutually perform a data communication through the bus. A storage configured to store therein pieces of identification information that are likely to be included in data transmitted by the corresponding communication node. A processor configured to perform first authentication processing between the communication relay device and a management device that is connected to the bus, and to perform second authentication processing according to a result of comparing identification information included in data transmitted by the corresponding communication node with the pieces of identification information stored in the storage. A transceiver configured to report, to the management device, a result of the second authentication processing when the first authentication processing has been successful.

10 Claims, 8 Drawing Sheets

(51) Int. Cl.
*G06F 21/00* (2013.01)
*H04L 9/32* (2006.01)
*H04W 12/06* (2009.01)
*H04W 4/04* (2009.01)

(52) U.S. Cl.
CPC ........ *H04L 9/3271* (2013.01); *H04L 63/0869* (2013.01); *H04L 63/0876* (2013.01); *H04W 4/046* (2013.01); *H04W 12/06* (2013.01); *H04W 12/12* (2013.01)

(58) Field of Classification Search
USPC .......................................................... 726/7
See application file for complete search history.

(56) References Cited

U.S. PATENT DOCUMENTS

| | | | |
|---|---|---|---|
| 2011/0083161 A1 | 4/2011 | Ishida et al. | |
| 2013/0227650 A1* | 8/2013 | Miyake | H04L 63/08 726/3 |
| 2013/0339721 A1 | 12/2013 | Yasuda | |
| 2014/0055555 A1* | 2/2014 | Imai | H04L 63/0428 348/14.09 |
| 2014/0101727 A1* | 4/2014 | Okuyama | H04L 63/20 726/4 |

FOREIGN PATENT DOCUMENTS

| | | |
|---|---|---|
| JP | 2015-065546 | 4/2015 |
| WO | WO2009-147734 | 12/2009 |

* cited by examiner

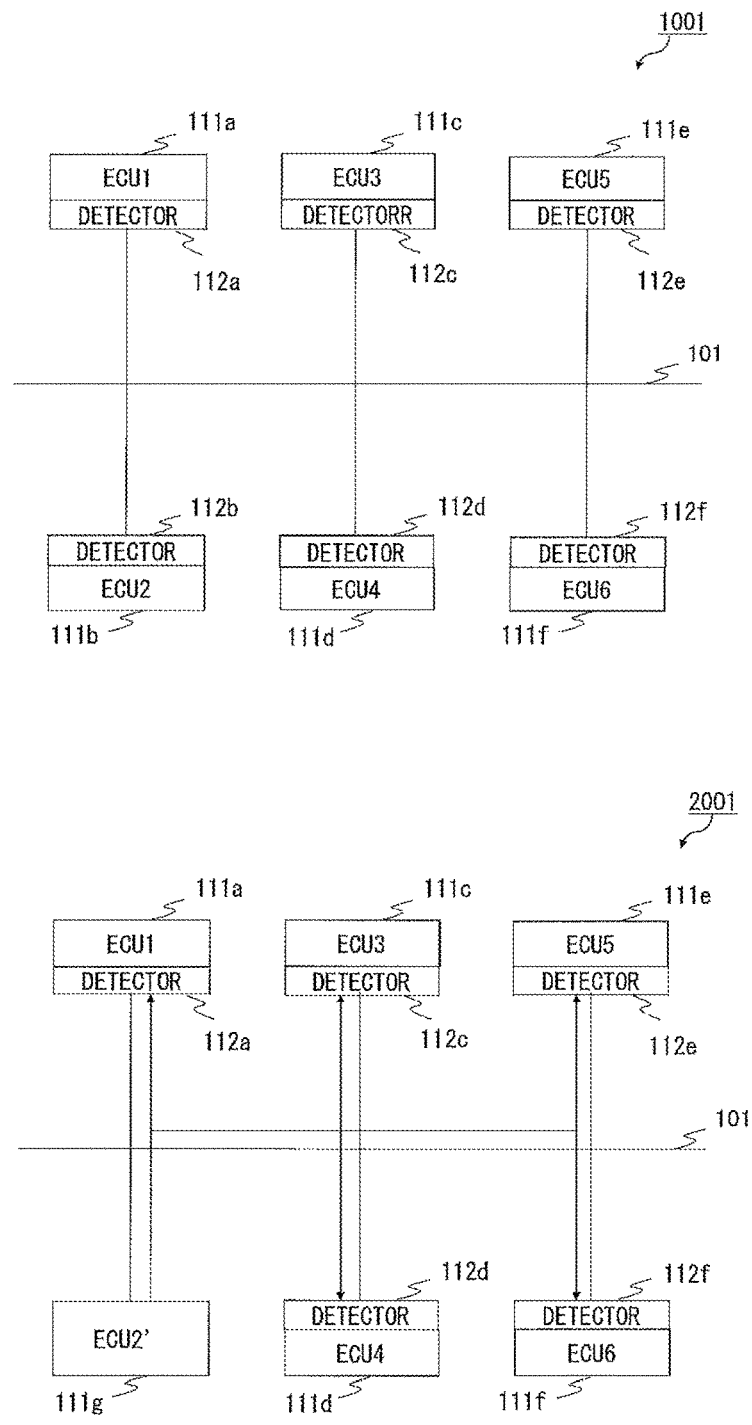
F I G. 1

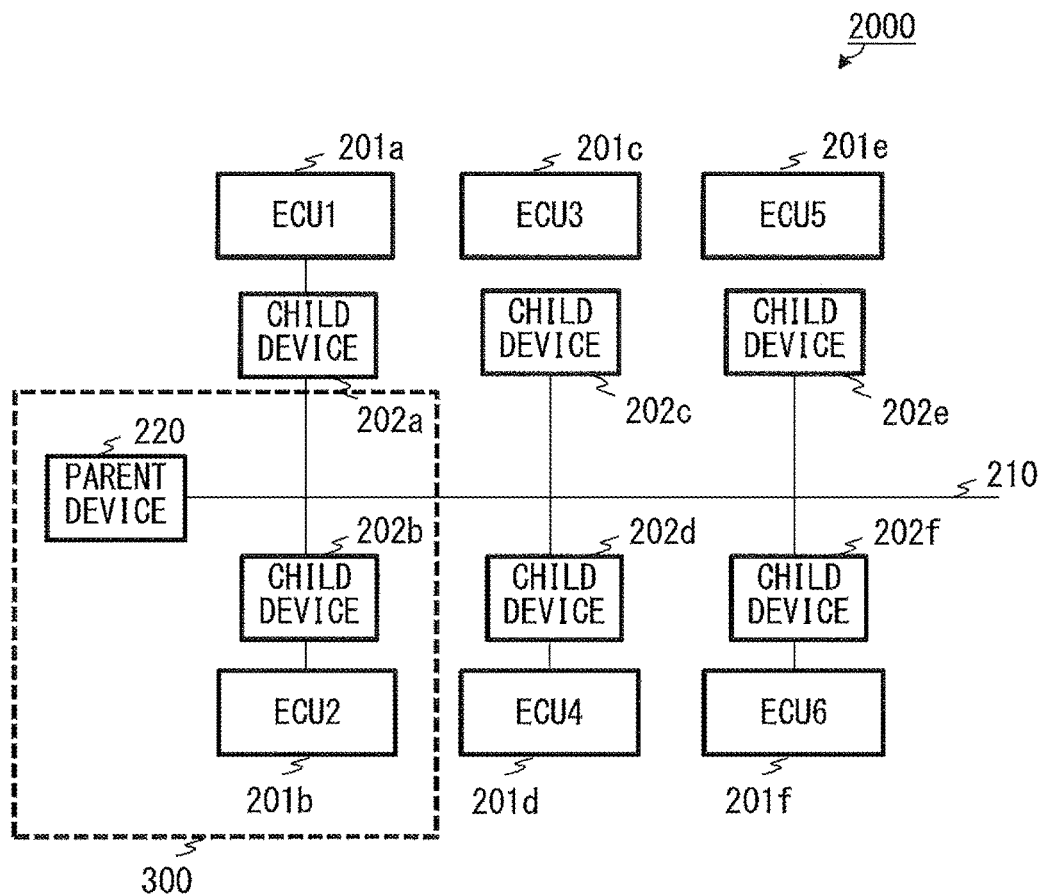
F I G. 2 A

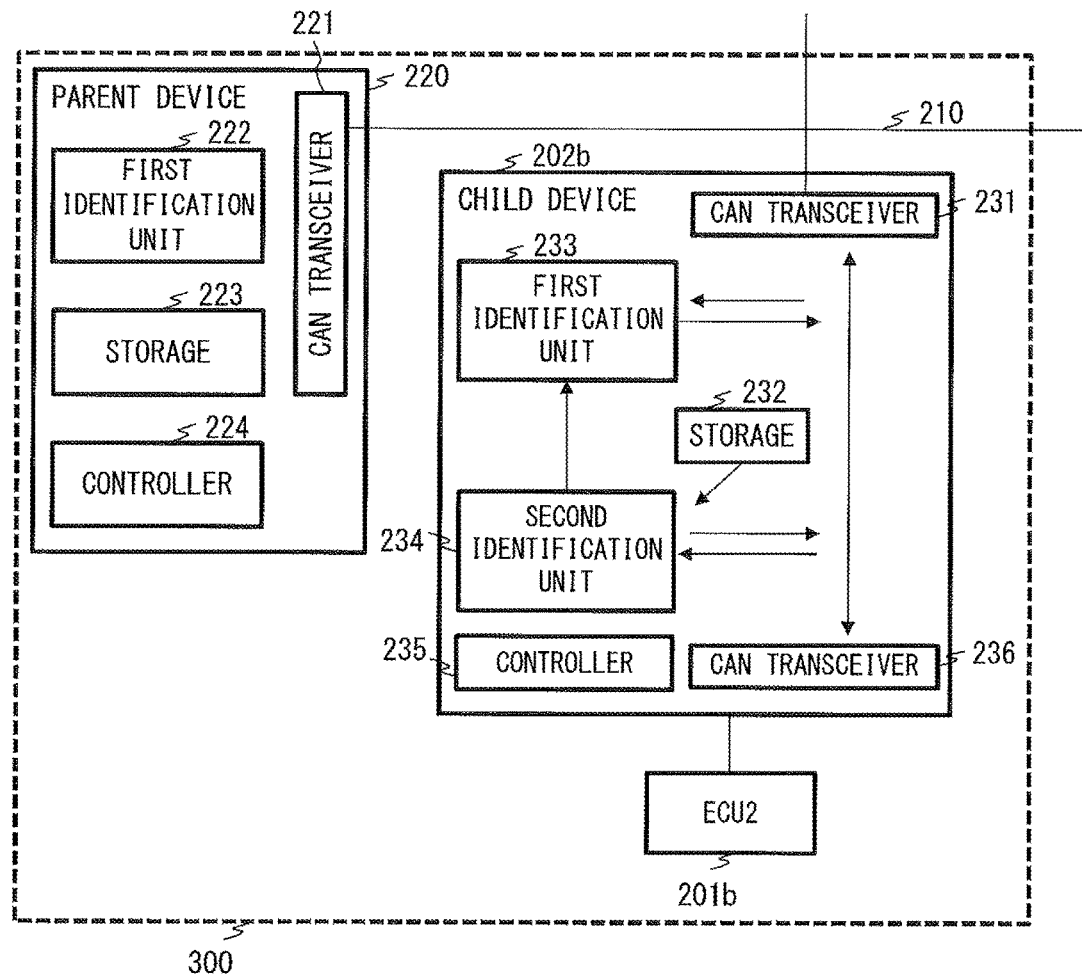
F I G. 6

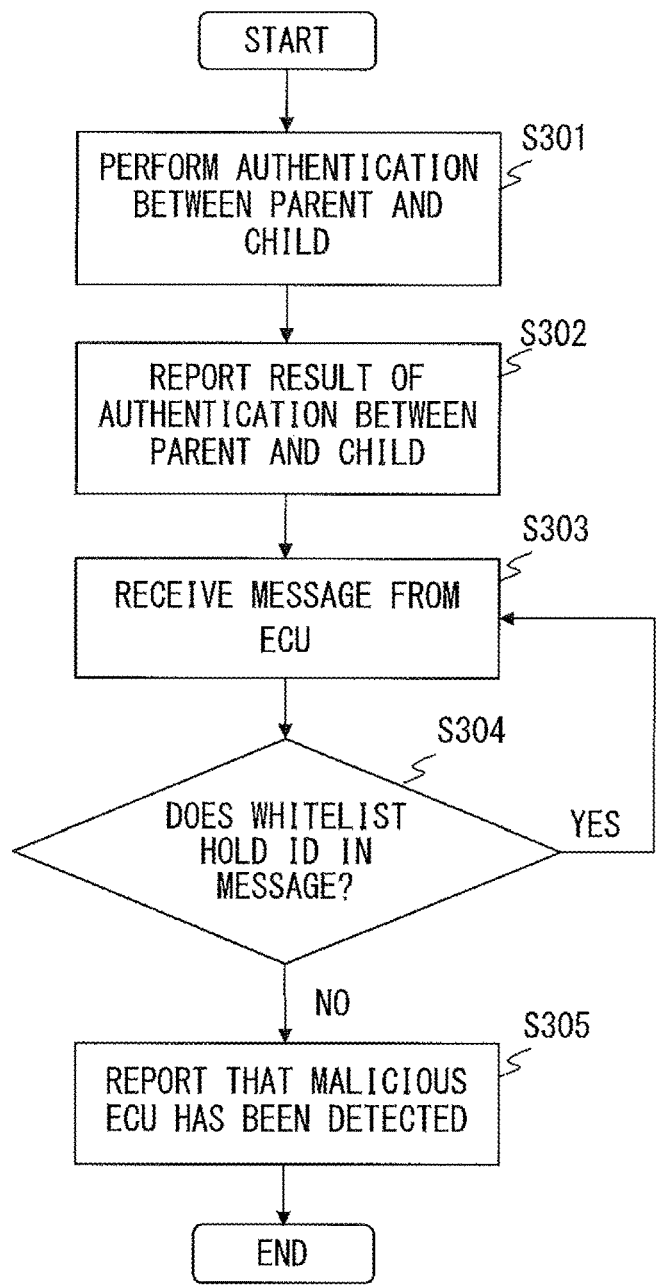
F I G. 7

COMMUNICATION RELAY DEVICE, COMMUNICATION NETWORK, AND COMMUNICATION RELAY METHOD

CROSS-REFERENCE TO RELATED APPLICATION

This application is based upon and claims the benefit of priority of the prior Japanese Patent Application No. 2015-146621, filed on Jul. 24, 2015, the entire contents of which are incorporated herein by reference.

FIELD

The embodiments discussed herein are related to a control of a communication between communication devices.

BACKGROUND

A network technology that is called a CAN (controller area network) may be used for performing transmission and reception of data between devices that are used for an on-board network of a vehicle or a factory automation of a vehicle. A system in which the CAN is used includes a plurality of ECUs (electronic control unit). The ECUs communicate with one another by performing transmission and reception of a message. A message that is used for a CAN communication includes identification information (ID) on the message. Further, each of the ECUs has stored therein an ID of a message to be received. A message is broadcast, and each of the ECUs receives a message that includes a set ID but discards a message that includes an ID that is not set to be received.

With respect to a network that is a CAN, a technology is known that rewrites data of a vehicle control device that controls a vehicle. A vehicle is equipped with a device for controlling transmission of data used for rewriting, the device monitoring a transmission state of data transmitted to a CAN bus and transmitting, to the CAN bus, a data frame of data used for rewriting according to the monitored transmission state of data (see, for example, Patent document 1).

A technology is known that permits a vehicle to perform authentication processing so as to determine the validity of an external device such as a maintenance device, which makes an access to an electronic control device of the vehicle. According to a result of the determination, the vehicle determines a range in which the maintenance device is allowed to access the electronic control device. This inhibits the external device from making an unwanted access to the electronic control device of the vehicle (see, for example, Patent document 2).

A technology is known that suppresses the occurrence of an inconvenient event that may be caused due to a communication performed between an external device and an in-vehicle communication system. An indirect route is provided as a communication route that leads to the in-vehicle communication system. The indirect route is provided with a switch that connects an upstream and a downstream or blocks a connection between them. The switch is controlled to connect to the indirect route when an indirect-route connecting request is received from an allowable external tool, and to block the indirect route in other cases (see, for example, Patent document 3).

A vehicle control device is known that detects a malicious message transmitted to an on-board communication network at a lower processing load. With respect to a message to be transmitted, the device performs message-related processing including a validity determination on the basis of whether an identifier included in the message to be transmitted is consistent with an identifier of the device. While performing the message-related processing with respect to a message transmitted by another control device, the device performs control so as not to perform the message-related processing with respect to a message transmitted by itself (see, for example, Patent document 4).

Patent document 1: Japanese Laid-open Patent Publication No. 2012-178035

Patent document 2: International Publication Pamphlet No. WO 2009/147734

Patent document 3: Japanese Laid-open Patent Publication No. 2015-5825

Patent document 4: Japanese Laid-open Patent Publication No. 2015-65546

SUMMARY

A communication relay device that is situated between a corresponding communication node and a bus in a communication network in which a plurality of communication nodes mutually perform a data communication through the bus. A storage configured to store therein pieces of identification information that are likely to be included in data transmitted by the corresponding communication node. A processor configured to perform a first authentication processing between the communication relay device and a management device that is connected to the bus, and to perform a second authentication processing according to a result of comparing identification information included in data transmitted by the corresponding communication node with the pieces of identification information stored in the storage. A transceiver configured to report, to the management device, a result of the second authentication processing when the first authentication processing has been successful.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram that illustrates an example of a CAN that includes a plurality of ECUs each provided with a detector;

FIG. 2A is a diagram that illustrates an example of a system according to a first embodiment;

FIG. 6 is a diagram that illustrates examples of the child device and the parent device according to a second embodiment; and FIG. 7 is a flowchart that illustrates an example of processing performed by the child device according to the second embodiment.

DESCRIPTION OF EMBODIMENTS

Figure 2B:
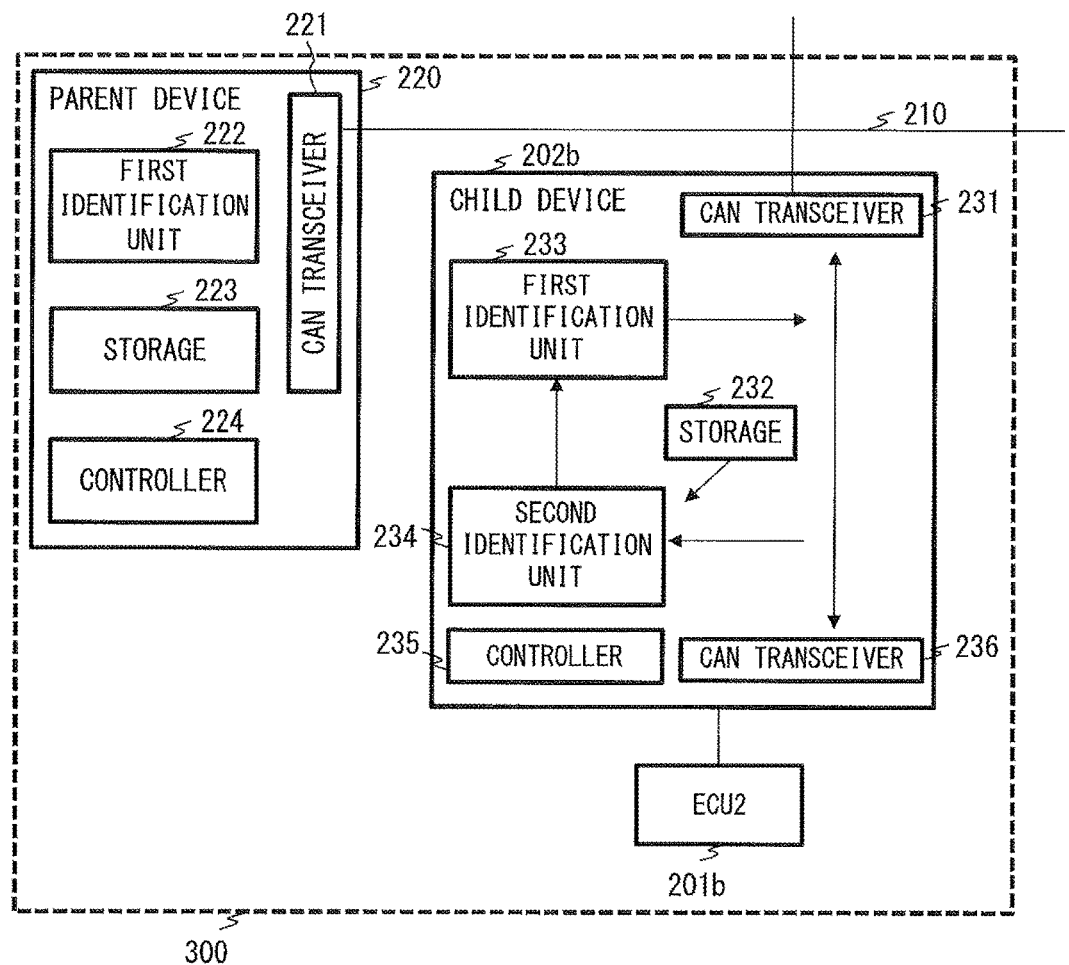
FIG. 2B is a diagram that illustrates the example of the system according to the first embodiment.

It is assumed that, in a CAN, a certain communication node (ECU) has been replaced by a malicious third party with another communication node (ECU). The replacement communication node transmits data that has a spoofing ID, that is, a message that has an ID to be transmitted by a different communication node, and the data arrives at all communication nodes. A communication node which was supposed to receive an ID that was spoofed by the spoofing ID receives this data, which may result in causing an unintended actuation.

A method is considered as protection against the above-described attack, the method including registering, in each communication node, IDs which the communication node itself is likely to transmit and comparing an ID included in received data with the registered IDs. When data received from a different communication node includes one of the IDs which a certain communication node is likely to transmit, the certain communication node can recognize that a malicious communication node has replaced one of the other communication nodes and spoofs the certain communication node.

However, in the above-described protection, it is possible to detect the existence of a replaced communication node, but not possible to identify the communication node that has been replaced. It is preferably possible to confirm which of the communication nodes has been replaced, preferably as integrated information.

In one aspect, it is an object of the present invention to provide a method that makes it possible to identify a communication node that has been maliciously replaced.

Embodiments of the present invention will now be described in detail with reference to the drawings.

FIG. 1 is a diagram that illustrates an example of a CAN that includes a plurality of ECUs each provided with a detector. A system 1001 includes a CAN 101 and ECUs 111 (111a to 111f). The ECUs 111a to 111g are connected to one another through the CAN 101. This permits the ECUs to mutually perform transmission and reception of a message. The ECUs 111a to 111f are provided, in their interfaces connected to the CAN 101, with detectors 112a (corresponding to the ECU 111a) to 112f (corresponding to the ECU 111f), respectively. The detector holds an ID of a message transmitted by the ECU as a whitelist. In this case, each of the ECUs can transmit a plurality of types of messages, and an ID is set that corresponds to each type of a message. It is assumed that different ECUs do not transmit messages having the same ID in the system 1001. The detector detects an anomaly when it receives a message that includes one of the IDs of a plurality of types of messages that are likely to be transmitted by its ECU. Further, the detector can detect that there exists an anomaly in the system 1001 when it receives one of the IDs of a plurality of types of messages that are likely to be transmitted by an ECU.

A system 1002 is an example of a system in which the ECU 111b of the system 1001 has been maliciously replaced by someone with an ECU 111g. The CAN 101, the ECU 111a, and the ECUs 111c to 111f in the system 1002 are similar to those in the system 1001. A message that includes one of the IDs of a plurality of types of messages that are likely to be transmitted by the ECU 111a is transmitted to the ECU 111g. When the ECU 111g transmits the message, the message arrives at the ECU 111a, and the ECUs 111c to 111f. Then, the detector 112a of the ECU 111a can detect an anomaly because the message that includes one of the IDs of the plurality of types of messages that are likely to be transmitted by its ECU 111a is received.

In the system 1002 of FIG. 1, when receiving a message that includes one of the IDs of the plurality of types of messages that the ECU 111a itself is likely to transmit, the ECU 111a can detect that one of the ECUs 111 in the system 1002 has been replaced by someone. However, in the system 1002 of FIG. 1, it is possible to detect that one of the ECUs 111 has been replaced by someone, but it is still not possible to identify the ECU 111 (hereinafter also referred to as a "communication node") that has been replaced.

A threat such as a malicious replacement or a falsification of an ECU exists in a vehicular network (CAN). Authentication performed between ECUs may permit a problem due to such a threat to be solved. However, in order for ECUs to perform authentication with respect to one another, an ECU needs to be modified so as to include a function for authentication, with the result that the ECU will not be applicable without any change with respect to a CAN. Thus, a vehicular network is needed that can protect against the threat without modifying an ECU.

Thus, according to the embodiments of the present invention, an authentication function is provided in a child device, not in an ECU. However, it is not possible to identify the ECU that has been maliciously replaced just by providing the authentication function in the child device. Therefore, a parent device is connected to a plurality of child devices through a CAN, and a function of a child-parent authentication that is performed between a parent device and a child device is introduced. One ECU is connected to each child device. The child device allows only data from a correspondingly connected (preregistered) ECU to pass through to the CAN. Accordingly, a whitelist of an ID corresponding to a message transmitted by the correspondingly connected ECU is registered. Further, the child device may be provided with information on a transmission period of a message that is transmitted from an ECU.

With respect to data from the ECU, when data that has an ID other than IDs registered in a whitelist arrives, or when a message arrives at a timing other than those in a transmission period of a message, the child device determines that the ECU is anomalous. When it determines that there exists an anomaly, the child device reports to the parent device by use of an ID that is not used by any ECU. This prevents an attack (a replacement or a falsification of an ECU) on a vehicular network, which permits a management device to identify the communication node that has been maliciously replaced.

FIGS. 2A and 2B are diagrams that illustrate an example of a system according to a first embodiment. A system 2000 includes a CAN 210, ECUs 201 (201a to 201f), child devices 202 (202a to 202f) and a parent device 220. The child devices are connected to one another through the CAN 210. The CAN 210 is, for example, a CAN bus. Further, the parent device 220 is also communicatively connected to the child devices through the CAN 210. The ECUs 201a to 201f are associated with the child devices 202a (corresponding to the ECU 201a) to 202f (corresponding to the ECU 201f), respectively, and are communicatively connected to one another through the CAN 210. A child device 202 is communicatively connected to an ECU 201 on a one-to-one basis through the CAN 210.

FIG. 2B illustrates a functional portion including the parent device 220 and the child device 202b that are included in the system 2000 of FIG. 2A. The child device 202b includes a CAN transceiver 231, a storage 232, a first authentication unit 233, a second authentication unit 234, a controller 235, and a CAN transceiver 236. Each of the child devices 202a to 202f except for the child device 202b is similar to the child device 202b. The CAN transceiver 231 is a communication interface that is used when the child device 202b communicates with another child device or the parent device 220 through the CAN 210. The CAN transceiver 236 is a communication interface that is used when the child device 202b communicates with the ECU 201b that is set in association with the child device 202b itself. The storage 232 stores therein, as a whitelist, IDs of a plurality of types of messages that are likely to be transmitted by an ECU 201. The whitelist registers therein an ID that corresponds to a message transmitted by an ECU that is preset on a one-to-one basis with a child device 202. The first authentication unit 233 communicates with the parent device 220, so as to perform processing of an authentication between the parent device 220 and the child device 202b. The second authentication unit 234 performs processing of authentication between the ECU 201b that is correspondingly connected to the child device 202b and the child device 202b. The controller 235 controls processing performed by, for example, the first authentication unit 233 and the second authentication unit 234. An arrow illustrated in the child device 202b of FIG. 2B indicates a flow of data.

The parent device 220 includes a CAN transceiver 221, a first authentication unit 222, a storage 223, and a controller 224. The CAN transceiver 221 is a communication interface that is used when the parent device 220 communicates with the child devices 202a to 202f through the CAN 210. The first authentication unit 222 performs a child-parent authentication between itself and the first authentication unit 233 of the child device 202. The storage 223 stores therein a result of an authentication between the parent device 220 and the child device 202 and a result of an authentication between an ECU 201 corresponding to a child device 202 and the child device 202. The controller 224 controls processing performed by, for example, the first authentication unit 222.

An example of processing performed by the parent device 220 and the child device 202b according to the first embodiment will now be described in turn.

(A1) A message is transmitted from the ECU 201b to the child device 202b.

(A2) The CAN transceiver 236 of the child device 202b receives the message transmitted from the ECU 201b.

(A3) The second authentication unit 234 starts performing processing of an authentication of the ECU 201b. The second authentication unit 234 determines whether an ID included in the received message is included in a whitelist that is held by the storage 232. In this case, it is assumed that the ECU 201b has still not been maliciously replaced with an ECU 201'. Thus, the ID included in the message received from the ECU 201b is held in the whitelist of the storage 232, so the second authentication unit 234 determines that the authentication of the ECU 201b has been successful. The child device 202 performs the processes of (A1) to (A3) repeatedly.

(A4) The first authentication unit 233 of the child device 202b starts performing processing of a child-parent authentication between the child device 202b and the parent device 220. The child-parent authentication may be performed regularly. The child-parent authentication is performed as preprocessing for reporting, to the parent device 220, a result of the authentication performed by the second authentication unit 234. In particular, the CAN transceiver 231 reports, to the parent device 220, a request for performing a child-parent authentication.

(A5) The first authentication unit 222 of the parent device 220 performs a child-parent authentication in response to the request. The first authentication unit 222 successfully performs a child-parent authentication between the child device 202b and the parent device 220. The CAN transceiver 221 reports a result of the child-parent authentication to the child device 202b. The result of the child-parent authentication is stored by the controller 224 of the parent device 220 in the storage 223.

(A6) When there are no problems with the child-parent authentication, the CAN transceiver 231 reports, to the parent device 220, the result of the child-parent authentication (successful) between the child device 202b and the ECU 201b.

(A7) The authentication result transmitted from the child device 202b is stored in the storage 223 by a control performed by the controller 224 of the parent device 220.

The processes of (A1) to (A7) are performed by each of the child devices 202a to 202f and the parent device 220. As a result, the parent device 220 can collect a result of a child-parent authentication between the parent device 220 and each of the child devices 202a to 202f and a result of an authentication between the child device 202 and the ECU 201 corresponding to each of the child devices 202a to 202f. The CAN transceiver 231 may operate as a report unit of the child device 202. The processing performed by the CAN transceiver 231 is controlled by, for example, the controller 235. The processing performed by the CAN transceiver 221 is controlled by, for example, the controller 224. The ECU 201 may be a communication node. The number of ECUs 201 and the number of child devices 202 are not limited to those in the system 2000 of FIG. 2.

Here, it is assumed that the ECU 201b has been maliciously replaced with the ECU 201'. An example of processing performed by the parent device 220 and the child device 202b when the ECU 201b in the system 2000 has been replaced with the malicious ECU 201' will now be described in turn. It is assumed that the ECU 201' transmits a message that includes an ID different from that of a message to be transmitted by the ECU 201b because the ECU 201' is a malicious replacement ECU.

(B1) A message is transmitted from the ECU 201' to the child device 202.

(B2) The CAN transceiver 236 of the child device 202b receives the message transmitted from the ECU 201'.

(B3) The second authentication unit 234 starts performing processing of an authentication of the ECU 201'. The second authentication unit 234 determines whether an ID included in the received message is included in a whitelist that is held by the storage 232. The ID included in the message received from the ECU 201' is not held in the whitelist of the storage 232, so the second authentication unit 234 determines that the authentication of the ECU 201' has been unsuccessful.

(B4) The first authentication unit 233 of the child device 202b starts performing processing of a child-parent authentication between the child device 202b and the parent device 220. The child-parent authentication may be performed regularly. The child-parent authentication is performed as preprocessing for reporting, to the parent device 220, a result of the authentication (unsuccessful) performed by the second authentication unit 234. In particular, the CAN transceiver 231 reports, to the parent device 220, a request for performing a child-parent authentication.

(B5) The first authentication unit 222 of the parent device 220 performs a child-parent authentication in response to the request. The first authentication unit 222 successfully performs a child-parent authentication between the child device 202b and the parent device 220. The CAN transceiver 221 reports a result of the child-parent authentication to the child device 202b. The result of the child-parent authentication is stored by the controller 224 of the parent device 220 in the storage 223.

(B6) When there are no problems with the child-parent authentication, the CAN transceiver 231 reports, to the parent device 220 the result of the child-parent authentication (unsuccessful) between the child device 202b and the ECU 201'.

(B7) The authentication result (unsuccessful) transmitted from the child device 202b is stored in the storage 223 by a control performed by the controller 224 of the parent device 220.

When an ECU 201 has been maliciously replaced, a child device 202 (202a to 202f) that communicates with a malicious ECU 201' performs the processes of (B1) to (B7). The parent device 220 can collect, from each of the child devices 202a to 202f, a result of an authentication of whether a corresponding ECU 201 that is connected to the child device 202 itself has been maliciously replaced. Thus, the parent device 220 can identify the ECU 201 (communication node) that has been maliciously replaced by collecting the authentication results. In other words, the child device 202 detects the ECU 201 that has been maliciously replaced, and reports the maliciously replaced ECU to the parent device 220. This permits the parent device 220 to identify the malicious ECU. The controller 224 of the parent device 220 may report an anomaly to a user by, for example, displaying, on a screen, the ECU 201' that is determined to be a malicious replacement. Further, the controller 224 of the parent device 220 may report to a system located outside the system 2000 that there exists a malicious replacement ECU 201'. The system 2000 includes the child devices 202 and the parent device 220, but the child device 202 may be referred to as a "relay device", and the parent device 220 may be referred to as a "management device" that manages the relay device and the ECU.

Figure 3:
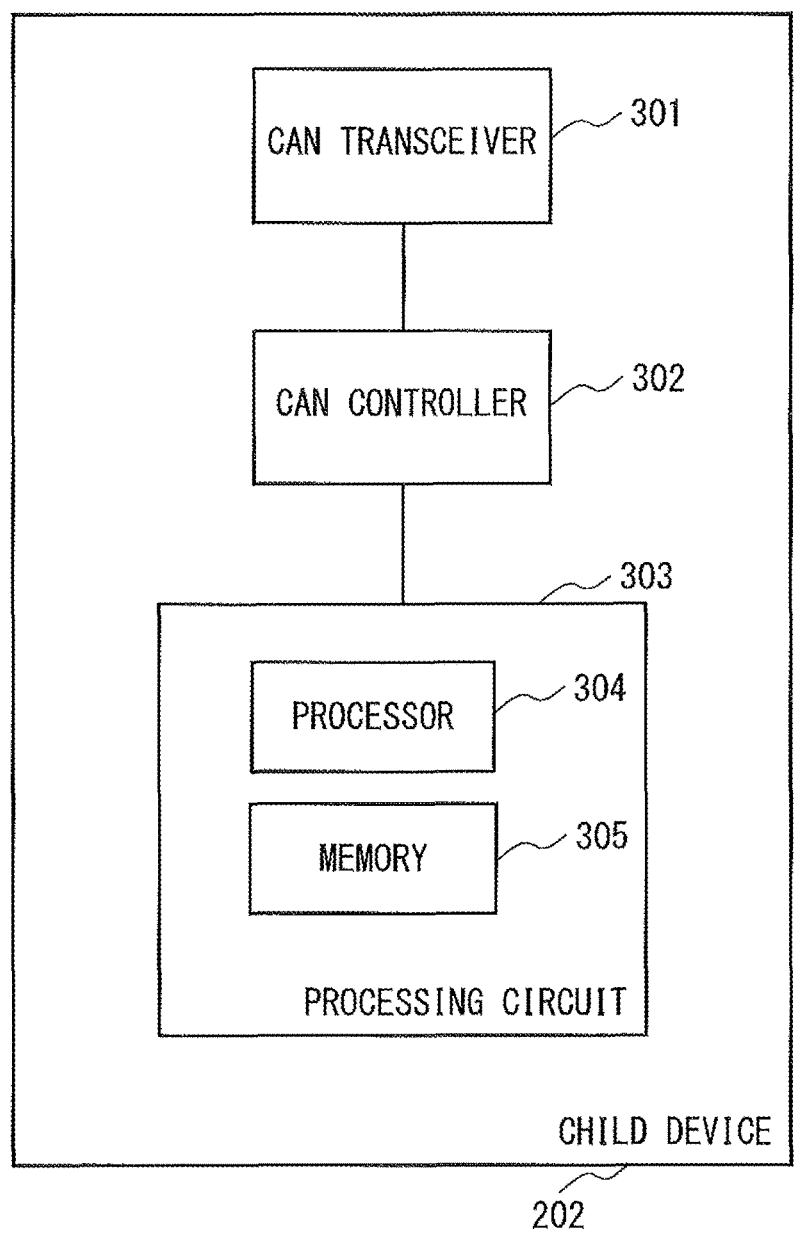
FIG. 3 is a diagram that illustrates an example of a hardware configuration.

FIG. 3 is a diagram that illustrates an example of a hardware configuration. Both the parent device 220 and the child device 202 are realized by pieces of hardware illustrated in FIG. 3. The child device 202 includes a CAN transceiver 301, a CAN controller 302, and a processing circuit 303. The processing circuit 303 includes a processor 304 and a memory 305.

The CAN transceiver 301 performs processing for the child device 202 to communicate with another device through a CAN network. The CAN controller 302 extracts, for example, data and an ID in a received message. The CAN controller 302 outputs the data to the processor 304. The processor 304 is any processing circuit. The processor reads a program stored in the memory 305 to perform processing.

In the parent device 220, the CAN transceiver 221 is realized by the CAN transceiver 301 and the CAN controller 302. The processor 304 operates as the first authentication unit 222 and the controller 224. The memory 305 operates as the storage 223.

The CAN transceiver 231 and the CAN transceiver 236 of the child device 202 are realized by the CAN transceiver 301 and the CAN controller 302. The processor 304 operates as the first authentication unit 233, the second authentication unit 234, and the controller 235. The memory 305 operates as the storage 232.

<Example of System Using Challenge and Response Method According to First Embodiment>

Referring to the example of the system 2000 illustrated in FIG. 2B, an example of the processing performed by the child device 202 and the parent device 220 using the challenge and response method will now be described in turn. It is assumed that the ECU 201b includes, in a message, one of the three IDs that are 0x123, 0x456, and 0x789, and transmits the message. It is assumed that the child device 202 and the parent device 220 hold a common key and an associated algorithm for authentication. It is sufficient if the common key and the algorithm for authentication are held in the storage 223 and the storage 232. In the following processing, a "report" refers to a broadcast communication.

(C1) The ECU 201b transmits, to the child device 202b, a message that includes one of the three IDs that are 0x123, 0x456, and 0x789.

(C2) The CAN 236 of the child device 202b receives the message transmitted from the ECU 201b.

(C3) The second authentication unit 234 starts performing processing of an authentication of the ECU 201b. The second authentication unit 234 determines whether an ID included in the received message is included in a whitelist that is held by the storage 232. The whitelist holds the three IDs that are 0x123, 0x456, and 0x789. The second authentication unit 234 compares the ID included in the received message with the IDs held in the whitelist and determines that the authentication of the ECU 201b has been successful. The child device 202 performs the processes of (C1) to (C3) repeatedly.

(C4) The first authentication unit 233 of the child device 202b starts performing processing of a child-parent authentication between the child device 202b and the parent device 220. The child-parent authentication may be performed regularly. For example, an authentication in the challenge and response method is used as the child-parent authentication. The child-parent authentication is performed as pre-processing for reporting, to the parent device 220, a result of the authentication performed by the second authentication unit 234. The child device makes a request for the parent device to start a challenge and response authentication. The first authentication unit 222 of the parent device generates a random number used for an authentication in the challenge and response method in response to an authentication request (including an ID that identifies the child device 202b (for example, 0x2)) received from the child device. The CAN transceiver 221 reports, to the parent device 220b, a message including the random number, an ID for a child-parent authentication (for example, 0x777), and the ID that identifies the child device 202b (for example, 0x2). This message is a "challenge" when authentication in the challenge and response method is performed.

(C5) When receiving the message including the ID for a child-parent authentication (0x777), the first authentication unit 233 of the child device 202b encrypts the random number included in the message using the random number and the common key held by the child device 202b. After this, the encrypted random number is referred to as an "encrypted text", and the algorithm for authentication is used to generate the encrypted text. The CAN transceiver 231 reports, to the parent device 220, a message including the encrypted text, the ID for a child-parent authentication (0x777), and the ID that identifies the child device 202b (0x2). This message is a "response" when authentication in the challenge and response method is performed. Further, the first authentication unit 233 of the child device 202b generates a random number and transmits, to the parent device 220, a message including the generated random number and an ID that identifies the child device 202 itself. Furthermore, the generated random number is encrypted by use of the common key and the result is held.

(C6) The first authentication unit 222 of the parent device 220 determines whether an encrypted text that is anticipated from the random number generated by the process of (C4) and the held common key is identical to the encrypted text included in the message that has been received as a response. When the encrypted texts are identical, the first authentication unit 222 of the parent device 220 determines that there are no problems with the child-parent authentication.

(C7) The first authentication unit 222 of the parent device 220 extracts the random number and the ID identifying the child device 202 from the encrypted text included in the message received as a response. The first authentication unit 222 generates an encrypted text using the random number extracted from the message received as a response and the common key.

(C8) The CAN transceiver 221 reports, to the child device 202b, a message that includes the encrypted text, the ID for a child-parent authentication (0x777), and the ID that identifies the child device 202b (0x2).

(C9) The first authentication unit 233 of the child device 220 determines whether the encrypted text generated in (C5) is identical to the encrypted text reported by the parent device 220 in (C8). When the encrypted texts are identical, the first authentication unit 233 of the child device 202b determines that there are no problems with the child-parent authentication. The authentication result is reported to the parent device. This report may be encrypted.

In (C4) to (C9), a child-parent authentication that authenticates both the parent device and the child device is started by the parent device side. However, the authentication may be started by the child device side. Further, a process in which the parent device authenticates the child device without authenticating both the parent device and the child device is also acceptable. Likewise, a process in which the child device authenticates the parent device without authenticating both the parent device and the child device is also acceptable.

(C10) The first authentication unit 222 of the parent device 220 obtains the authentication result transmitted from the child device 202b and decrypts the authentication result transmitted from the child device 202b (when they are encrypted).

(C11) The authentication results transmitted from the child device 202b is stored in the storage 223 by a control performed by the controller 224 of the parent device 220.

The processes of (C1) to (C11) are performed by each of the child devices 202a to 202f and the parent device 220. As a result, the parent device 220 can collect a result of a child-parent authentication between the parent device 220 and each of the child devices 202a to 202f and a result of an authentication between the child device 202 and the ECU 201 corresponding to each of the child devices 202a to 202f.

Next, it is assumed that the ECU 201b has been maliciously replaced with the ECU 201'. An example of processing performed by the parent device 220 and the child device 202b when the ECU 201b in the system 2000 has been replaced with the malicious ECU 201' will now be described in turn. The ECU 201' transmits a message including an ID that is 0x111 and tries to have other ECUs 201 operate erroneously.

(D1) A message is transmitted from the ECU 201' to the child device 202.

(D2) The CAN transceiver 236 of the child device 202b receives the message transmitted from the ECU 201'.

(D3) The second authentication unit 234 starts performing processing of an authentication of the ECU 201'. The second authentication unit 234 determines whether an ID 0x111 included in the received message is included in a whitelist (including 0x123, 0x456, and 0x789) that is held by the storage 232. The ID 0x111 included in the message received from the ECU 201' is not held in the whitelist (including 0x123, 0x456, and 0x789) of the storage 232, so the second authentication unit 234 determines that the authentication of the ECU 201' has been unsuccessful.

(D4) In response to an authentication request (including an ID that identifies the child device 202b (for example, 0x2)) received from the child device, the first authentication unit 222 of the parent device starts performing processing of a child-parent authentication between the parent device and the child device 202b. For example, an authentication in the challenge and response method is used as the child-parent authentication. The child-parent authentication may be performed regularly. The child-parent authentication is performed as preprocessing for reporting, to the parent device 220, a result of the authentication (unsuccessful) performed by the second authentication unit 234. The first authentication unit 222 of the parent device generates a random number used for an authentication in the challenge and response method. The CAN transceiver 221 reports, to the child device 202b, a message (a challenge) including the random number, an ID for a child-parent authentication (for example, 0x777), and the ID that identifies the child device 202b (for example, 0x2).

(D5) When receiving the message including the ID for a child-parent authentication (0x777), the first authentication unit 233 of the child device 202b encrypts the random number included in the message using the random number and the common key held by the child device 202b. The CAN transceiver 231 reports, to the parent device 220, a message (a response) including the encrypted text, the ID for a child-parent authentication (0x777), and the ID that identifies the child device 202b (0x2). Further, the first authentication unit 233 of the child device 202b generates a random number and transmits, to the parent device 220, a message including the generated random number and an ID that identifies the child device 202 itself. Furthermore, the generated random number is encrypted by use of the common key and the result is held.

(D6) The first authentication unit 222 of the parent device 220 determines whether an encrypted text that is anticipated from the random number generated by the process of (D4) and the held common key is identical to the encrypted text included in the message that has been received as a response. When the encrypted texts are identical, the first authentication unit 222 of the parent device 220 determines that there are no problems with the child-parent authentication.

(D7) The first authentication unit 222 of the parent device 220 extracts the random number and the ID identifying the child device 202 from the encrypted text included in the message received as a response. The first authentication unit 222 generates an encrypted text using the random number extracted from the message received as a response and the common key.

(D8) The CAN transceiver 221 reports, to the child device 202b, a message that includes the encrypted text, the ID for a child-parent authentication (0x777), and the ID that identifies the child device 202b (0x2).

(D9) The first authentication unit 233 of the child device 220 determines whether the encrypted text generated in (D5)

is identical to the encrypted text reported by the parent device 220 in (D8). When the encrypted texts are identical, the first authentication unit 233 of the child device 202*b* determines that there are no problems with the child-parent authentication. The authentication result is reported to the parent device. This report may be encrypted.

In (D4) to (D9), a child-parent authentication that authenticates both the patent device and the child device is started by the parent device side. However, the authentication may be started by the child device side. Further, a process in which the parent device authenticates the child device without authenticating both the parent device and the child device is also acceptable. Likewise, a process in which the child device authenticates the parent device without authenticating both the parent device and the child device is also acceptable.

(D10) The first authentication unit 222 of the parent device 220 obtains the transmitted result of the authentication performed by the second authentication unit 234 of the child device 202*b* by performing decryption (when it is encrypted).

(D11) The authentication result transmitted from the child device 202*b* is stored in the storage 223 by a control performed by the controller 224 of the parent device 220.

When an ECU 201 has been maliciously replaced, a child device 202 (202*a* to 202*f*) that communicates with a malicious ECU 201' performs the processes of (D1) to (D11). The parent device 220 can collect, from each of the child devices 202*a* to 202*f*, a result of an authentication of whether a corresponding ECU 201 that is connected to the child device 202 itself has been maliciously replaced. Thus, the parent device 220 can identify the ECU 201 (communication node) that has been maliciously replaced by collecting the authentication results. In other words, the child device 202 detects by itself the ECU 201 that has been maliciously replaced, which permits the parent device 220 to identify the maliciously replaced ECU 201. In the child-parent authentication in the challenge and the response method, the child device 202*b* side may generate a random number and only authenticate the parent device, or both the parent device 220 and the child device 202*b* may generate random numbers and authenticate mutually.

Figure 4:
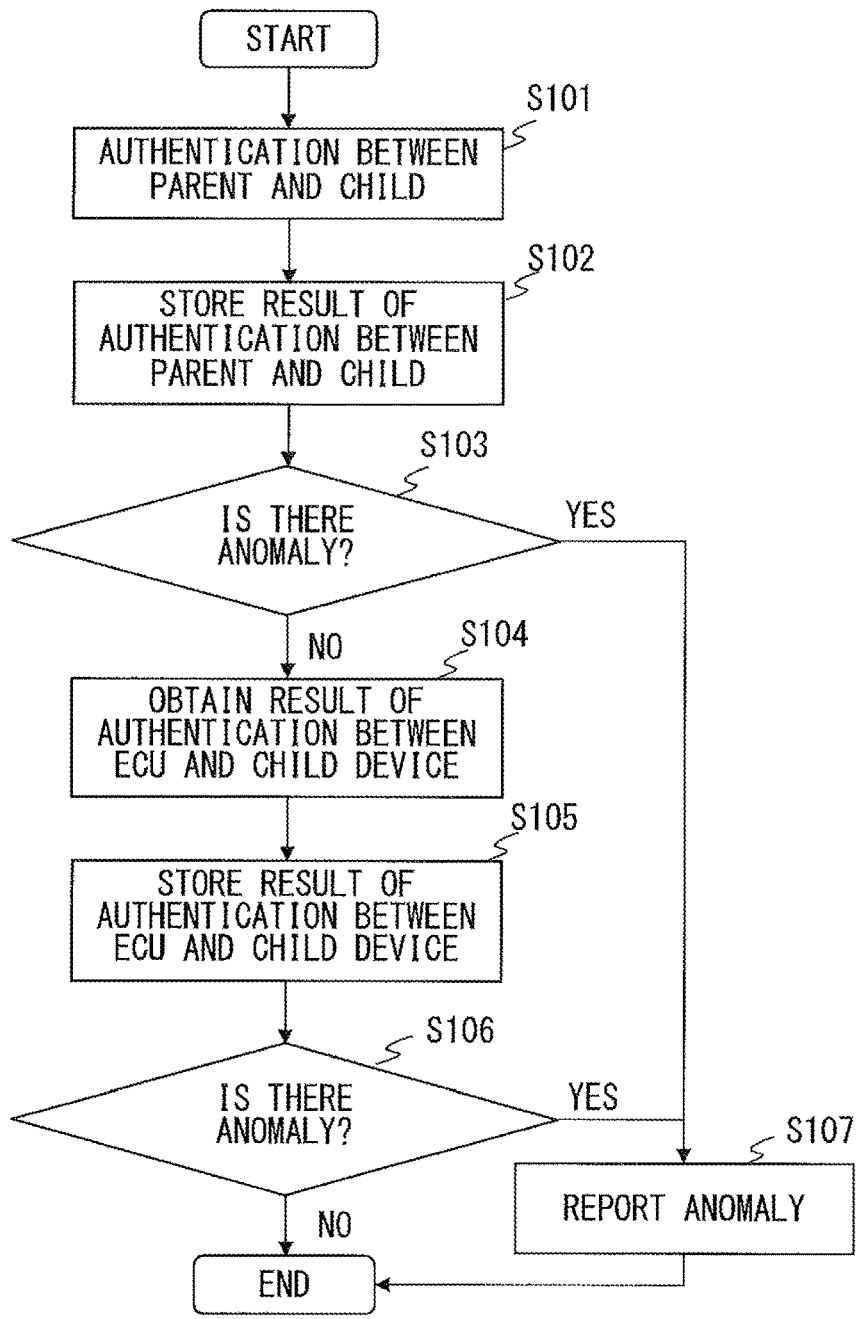
FIG. 4 is a flowchart that illustrates an example of processing performed by a parent device according to the first embodiment.

FIG. 4 is a flowchart that illustrates an example of processing performed by the parent device according to the first embodiment. The first authentication unit 222 of the parent device 220 performs a parent-child authentication (Step S101). A result of the child-parent authentication is stored in the storage 223 by a control performed by the controller 224 of the parent device 220 (Step S102). The controller 224 determines whether there are any problems with the child-parent authentication (Step S103). When there are no problems with the child-parent authentication (NO in Step S103), the first authentication unit 222 of the parent device 220 obtains a result of an authentication between the ECU 201 and the child device 202 through the CAN transceiver 221 (Step S104). The result of the authentication between the ECU 201 and the child device 202 is stored in the storage 223 by a control performed by the controller 224 of the parent device 220 (Step S105). The controller 224 determines whether there are any problems with the authentication between the ECU 201 and the child device 202 (Step S106). When there is an anomaly in the child-parent authentication (YES in Step S103) or when there is an anomaly in the authentication between the ECU 201 and the child device 202 (YES in Step S106), the controller 224 reports that the parent device 220 has detected an anomaly in a device with which it can communicate (Step S107). When the process of Step S106 or Step S107 is terminated, the processing performed by the parent device 220 according to the first embodiment is terminated. The parent device 220 performs the processes of Steps S101 to S107 for each of the child devices 202*a* to 202*f*. Further, the processing is performed regularly.

Figure 5:
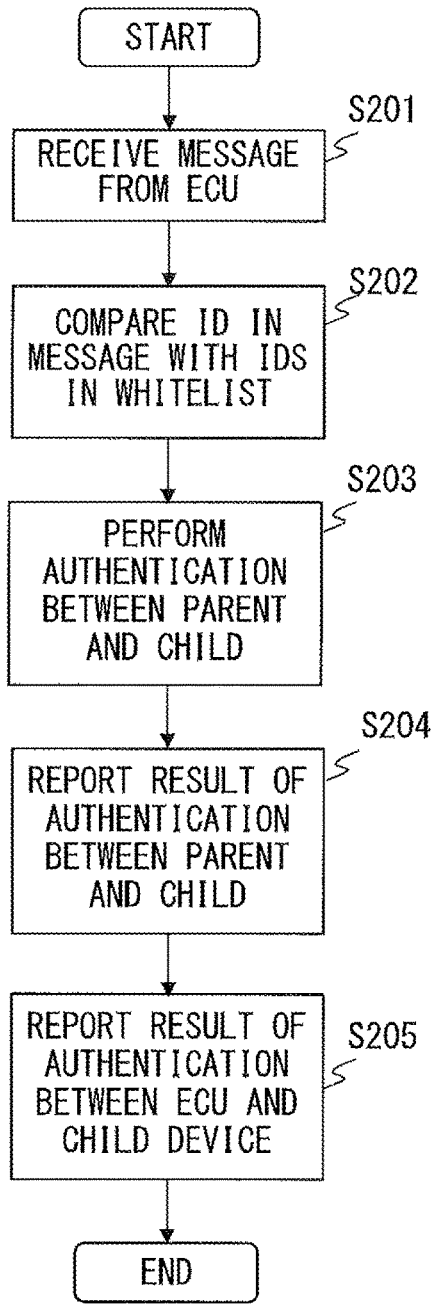
FIG. 5 is a flowchart that illustrates an example of processing performed by a child device according to the first embodiment.

FIG. 5 is a flowchart that illustrates an example of processing performed by the child device according to the first embodiment. The CAN transceiver 236 receives a message transmitted from the ECU 201 (Step S201). The second authentication unit 234 of the child device 202 determines whether an ID included in the message is included in a whitelist that is held by the storage 232 (Step S202). The first authentication unit 233 of the child device 202 performs a child-parent authentication between the child device 202 and the parent device 220 (Step S203). When the child device needs to authenticate the parent device, the CAN transceiver 231 reports a result of the child-parent authentication to the parent device 220 (Step S204). The CAN transceiver 231 reports a result of the authentication between the ECU 201 and the child device 202 (a result obtained in Step S202) to the parent device 220 (Step S205). The processes of Step S204 and Step S205 may be performed in parallel or sequentially. The processing of FIG. 5 is performed every time the child device 202 receives a message from the ECU 201.

In the processing of FIG. 4 and the processing of FIG. 5, the parent device 220 can collect, from each of the child devices 202*a* to 202*f*, a result of an authentication of whether a corresponding ECU 201 that is connected to the child device 202 itself has been maliciously replaced. Thus, the parent device 220 can identify the ECU 201 (communication node) that has been maliciously replaced by collecting the authentication results. In other words, the child device 202 detects the ECU 201 that has been maliciously replaced, and reports the maliciously replaced ECU 201 to the parent device 220 so that the parent device 220 can identify it. The controller 224 of the parent device 220 may report an anomaly to a user by, for example, displaying, on a screen, a malicious replacement ECU 201'. Further, the controller 224 of the parent device 220 may report to a system located outside the system 2000 that there exists a malicious replacement ECU 201'.

FIG. 6 is a diagram that illustrates examples of the child device and the parent device according to a second embodiment. A block configuration of the child device 202 and the parent device 220 of the second embodiment is similar to that of the child device 202 and the parent device 220 of the first embodiment in FIG. 2B. Thus, in FIG. 6, like reference numbers are used that represent the same elements as in FIG. 2B. In the child device 202*b* of FIG. 6, an arrow that indicates a flow of data is different from that in the child device 202*b* of FIG. 2B. In particular, in the child device 202*b* of FIG. 2B, when a message from the ECU 201 is received, the second authentication unit 234 performs an authentication between the child device 202 and the ECU 201, and then, the first authentication unit 233 performs a child-parent authentication. In the second embodiment, the order of the processing of authentication performed by the second authentication unit 234 and the processing of authentication performed by the first authentication unit 233 is different.

(E1) All of the devices (the parent device 220 and the child devices 202) included in the system 2000 are powered on. When all of the devices (the parent device 220 and the child devices 202) included in the system 2000 have been powered on, the first authentication unit 222 performs a child-parent authentication between each of the child devices 202 and the parent device 220.

(E2) A result of the child-parent authentication between each of the child devices 202 and the parent device 220 is stored in the storage 223 by a control performed by the controller 224 of the parent device 220.

(E3) When there is a message from the ECU 201, a child device 202 which does not have any problems with the child-parent authentication starts receiving the message.

(E4) The message is transmitted from the ECU 201b to the child device 202b.

(E5) The CAN transceiver 236 of the child device 202b receives the message transmitted from the ECU 201b.

(E6) The second authentication unit 234 starts performing processing of an authentication of the ECU 201b. The second authentication unit 234 determines whether an ID included in the received message is included in a whitelist that is held by the storage 232. In this case, it is assumed that the ECU 201b has still not been maliciously replaced with an ECU 201'. Thus, the ID included in the message received from the ECU 201b is held in the whitelist of the storage 232, so the second authentication unit 234 determines that the authentication of the ECU 201b has been successful.

(E7) The CAN transceiver 231 reports, to the parent device 220, a result of the authentication of the ECU 201b in the child device 202b. The CAN transceiver 231 performs report processing by being controlled by the controller 235. The result of the authentication of the ECU 201b in the child device 202b may be reported to the parent device 220 in an encrypted state.

(E8) The authentication result (successful) transmitted from the child device 202b is stored in the storage 223 by a control performed by the controller 224 of the parent device 220.

The processes of (E1) and (E2) are performed when the parent device 220 and the child devices 202 are powered on, and a child-parent authentication is performed between each of the child devices 202 and the parent device 220 in the system. After that, the processes of (E4) to (E8) are repeatedly performed between a child device 202 and the parent device 220. In this way, if a child-parent authentication is completed when powering on, it is possible to omit subsequent processing of a child-parent authentication that is performed every time processing of an authentication between an ECU 201 and a child device 202 is performed. Thus, compared with the system 2000 according to the first embodiment, the number of processings of a child-parent authentication can be reduced, which results in making a load of the parent device 220 lighter.

Here, it is assumed that the ECU 201b has been maliciously replaced with an ECU 201'. It is assumed that the ECU 201' transmits a message that includes an ID that is different from that included in a message transmitted by the ECU 201b because the ECU 201' is a malicious replacement ECU.

(E9) A message is transmitted from the ECU 201' to the child device 202.

(E10) The CAN transceiver 236 of the child device 202b receives the message transmitted from the ECU 201'.

(E11) The second authentication unit 234 starts performing processing of an authentication of the ECU 201'. The second authentication unit 234 determines whether an ID included in the received message is included in a whitelist that is held by the storage 232. The ID included in the message received from the ECU 201' is not held in the whitelist of the storage 232, so the second authentication unit 234 determines that the authentication of the ECU 201' has been unsuccessful.

(E12) The CAN transceiver 231 reports, to the parent device 220, a result of the authentication (unsuccessful) between the child device 202b and the ECU 201'. The result of the authentication of the ECU 201b in the child device 202b may be reported to the parent device 220 in an encrypted state.

(E13) The authentication result (unsuccessful) transmitted from the child device 202b is stored in the storage 223 by a control performed by the controller 224 of the parent device 220.

When an ECU 201 has been maliciously replaced, a child device 202 (202a to 202f) that communicates with a malicious ECU 201' and the parent device 220 perform the processes of (E9) to (E13). The parent device 220 can collect, from each of the child devices 202a to 202f, a result of an authentication of whether a corresponding ECU 201 that is connected to the child device 202 itself has been maliciously replaced. Thus, the parent device 220 can identify the ECU 201 (communication node) that has been maliciously replaced by collecting the authentication results. In other words, the child device 202 detects the ECU 201 that has been maliciously replaced, and reports the maliciously replaced ECU 201 to the parent device 220 so that the parent device 220 can identify it. The controller 224 of the parent device 220 may report an anomaly to a user by, for example, displaying, on a screen, a malicious replacement ECU 201'. Further, the controller 224 of the parent device 220 may report to a system located outside the system 2000 that there exists a malicious replacement ECU 201'. Moreover, in the processes of (E9) to (13), child-parent authentication processing is not performed when a result of an authentication between an ECU 201 and a child device 202 is reported to the parent device 220. Thus, compared with the system 2000 according to the first embodiment, a load of the parent device 220 can be made lighter.

<Example of System Using Challenge and Response Method According to Second Embodiment>

Referring to FIG. 6, an example of the processing performed by the child device 202 and the parent device 220 using the challenge and response method will now be described in turn. It is assumed that the ECU 201b includes, in a message, one of the three IDs that are 0x123, 0x456, and 0x789, and transmits the message.

(F1) All of the devices (the parent device 220 and the child devices 202) included in the system 2000 are powered on. When all of the devices (the parent device 220 and the child devices 202) included in the system 2000 have been powered on, the parent device 220 starts performing processing of a child-parent authentication between itself and each of the child devices 202. For example, an authentication in the challenge and response method is used as the child-parent authentication.

(F2) The first authentication unit 222 of the parent device 220 generates the same number of random numbers as the number of child devices 202 connected to the parent device 220. A random number is used for an authentication in the challenge and response method. The generated random number includes an ID that corresponds to each of the child devices 202. Thus, the generated random number is generated correspondingly to each of the child devices 202. The CAN transceiver 221 reports, to a child device 202, a message including the random number, an ID for a child-parent authentication (for example, 0x777), and an ID that identifies the child device 202b (for example, 0x2). This message is a challenge when authentication in the challenge and response method is performed.

(F3) When receiving the message including the ID for a child-parent authentication (0x777), the first authentication unit 233 of the child device 202 encrypts the random number included in the message using the random number and the common key held by the child device 202. The CAN transceiver 231 reports, to the parent device 220, a message including the encrypted text, the ID for a child-parent authentication (0x777), and the ID that identifies the child device 202b (0x2). This message is a response when authentication in the challenge and response method is performed.

(F4) The first authentication unit 222 of the parent device 220 determines whether an encrypted text that is anticipated from the random number generated by the process of (F2) and the held common key is identical to the encrypted text included in the message that has been received as a response. When the encrypted texts are identical, the first authentication unit 222 of the parent device 220 determines that there are no problems with the child-parent authentication. The first authentication unit 233 of the child device 202 generates a random number and transmits, to the parent device 220, a message including the generated random number and an ID that identifies the child device 202 itself.

(F5) The first authentication unit 222 of the parent device 220 extracts the encrypted text, the random number and the ID identifying the child device 202 included in the message received as a response. The first authentication unit 222 determines whether the ID that identifies the child device 202 included in the message is identical to an ID that indicates the child device 202 that has transmitted the response. When the IDs are identical, the first authentication unit 222 of the parent device 220 generates an encrypted text using the random number extracted from the message received as a response and the common key.

(F6) The CAN transceiver 221 reports, to the child device 202b, a message that includes the encrypted text, the ID for a child-parent authentication (0x777), and the ID that identifies the child device 202b (0x2).

(F7) The first authentication unit 233 of the child device 202 determines whether the encrypted text generated in (F3) is identical to the encrypted text reported by the parent device 220 in (F6). When the encrypted texts are identical, the first authentication unit 233 of the child device 202 determines that there are no problems with the child-parent authentication. At the same time, the first authentication unit 233 of the child device 202 determines whether an ID that identifies a certain child device 202 included in the message reported by the parent device 220 in (F6) is the ID of the child device 202 itself. When the IDs are identical and when there are no problems with the child-parent authentication, the CAN transceiver 231 reports, to the parent device 220, a message including a result of the child-parent authentication (no problem), the ID for a child-parent authentication (0x777), and the ID that identifies the child device 202b (0x2). The child-parent authentication result may be encrypted.

(F8) The first authentication unit 222 of the parent device 220 obtains the transmitted result of the authentication performed by the second authentication unit 234 of the child device 202b by performing decryption (when it is encrypted).

(F9) The authentication result transmitted from the child device 202b is stored in the storage 223 by a control performed by the controller 224 of the parent device 220.

(F10) When there is a message from the ECU 201, a child device 202 which does not have any problem with the child-parent authentication starts receiving the message. The message is transmitted from the ECU 201b to the child device 202b.

(F11) The CAN transceiver 236 of the child device 202b receives the message transmitted from the ECU 201b.

(F12) The second authentication unit 234 starts performing processing of an authentication of the ECU 201b. The second authentication unit 234 determines whether an ID included in the received message is included in a whitelist that is held by the storage 232. In this case, it is assumed that the ECU 201b has still not been maliciously replaced with an ECU 201'. Thus, the ID included in the message received from the ECU 201b is held in the whitelist of the storage 232, so the second authentication unit 234 determines that the authentication of the ECU 201b has been successful.

(F13) The CAN transceiver 231 reports, to the parent device 220, a message including a result of the authentication of the ECU 201b in the child device 202b, the ID for a child-parent authentication (0x777), and the ID that identifies the child device 202b (0x2). The result of the authentication of the ECU 201b in the child device 202b may be regularly reported to the parent device 220. The authentication result may be reported to the parent device 220 in an encrypted state.

(F14) The authentication result (successful) transmitted from the child device 202b is stored in the storage 223 by a control performed by the controller 224 of the parent device 220.

The processes of (F1) to (F9) are performed when the parent device 220 and the child devices 202 are powered on, and a child-parent authentication is performed between each of the child devices 202 and the parent device 220 in the system. After that, the processes of (F10) to (F14) are repeatedly performed between a child device 202 and the parent device 220. In this way, if a child-parent authentication is completed when powering on, it is possible to omit subsequent processing of a child-parent authentication that is performed every time processing of an authentication between an ECU 201 and a child device 202 is performed. Thus, compared with the system 2000 according to the first embodiment, the number of processings of a child-parent authentication can be reduced, which results in making a load of the parent device 220 lighter.

Here, it is assumed that the ECU 201b has been maliciously replaced with an ECU 201'. It is assumed that the ECU 201' transmits a message that includes an ID (0x111) that is different from an ID (0x123, 0x456, or 0x789) included in a message transmitted by the ECU 201b because the ECU 201' is an ECU that has replaced maliciously.

(F15) A message is transmitted from the ECU 201' to the child device 202.

(F16) The CAN transceiver 236 of the child device 202b receives the message transmitted from the ECU 201'.

(F17) The second authentication unit 234 starts performing processing of an authentication of the ECU 201'. The second authentication unit 234 determines whether the ID 0x111 included in the received message is included in a whitelist (including 0x123, 0x456, and 0x789) that is held by the storage 232. The ID 0x111 included in the message received from the ECU 201' is not held in the whitelist of the storage 232, so the second authentication unit 234 determines that the authentication of the ECU 201' has been unsuccessful.

(F18) The CAN transceiver 231 reports, to the parent device 220, a message including a result of the authentication of the ECU 201b in the child device 202b, the ID for a child-parent authentication (0x777), and the ID that identifies the child device 202b (0x2). The authentication result may be reported in an encrypted state.

(F19) The authentication result (unsuccessful) transmitted from the child device 202b is stored in the storage 223 by a control performed by the controller 224 of the parent device 220.

In the process of (F13), a result of an authentication (successful) of the ECU 201b in the child device 202b is reported to the parent device 220. However, when it is determined that the authentication of the ECU 201b in the child device 202b has been unsuccessful, the child device 220 may report a result of the authentication to the parent device 220.

When an ECU 201 has been maliciously replaced, a child device 202 (202a to 202f) that communicates with a malicious ECU 201' performs the processes of (F15) to (F19). The parent device 220 can collect, from each of the child devices 202a to 202f, a result of an authentication of whether a corresponding ECU 201 that is connected to the child device 202 itself has been maliciously replaced. Thus, the parent device 220 can identify the ECU 201 (communication node) that has been maliciously replaced by collecting the authentication results. In other words, the child device 202 detects by itself the ECU 201 that has been maliciously replaced, which permits the parent device 220 to identify the maliciously replaced ECU 201. In the child-parent authentication in the challenge and the response method, the parent device 220 side may generate a random number and authenticate the child device, or the child device 202 may generate a random number and authenticate the parent device.

FIG. 7 is a flowchart that illustrates an example of processing performed by the child device according to the second embodiment. The first authentication unit 233 of the child device 202 performs a child-parent authentication in response to a request issued by the parent device 220 (Step S301). The CAN transceiver 231 reports a result of the child-parent authentication to the parent device 220 (Step S302). The CAN transceiver 236 receives a message transmitted from the ECU 201 (Step S303). The second authentication unit 234 determines whether an ID included in the message received from the ECU 201 is included in a whitelist that is held by the storage 232 (Step S304). When the ID included in the message received from the ECU 201 is included in the whitelist that is held by the storage 232 (YES in Step S304), the child device 202 repeats the processes from Step S303. When the ID included in the message received from the ECU 201 is not included in the whitelist that is held by the storage 232 (NO in Step S304), the CAN transceiver 231 reports to the parent device 220 that a malicious ECU 201 has been detected (Step S305). When the process of Step S305 is terminated, the child device 202 terminates the processing.

When an ECU 201 has been maliciously replaced, the parent device 220 can collect, from each of the child devices 202a to 202f, a result of an authentication of whether a corresponding ECU 201 that is connected to the child device 202 itself has been maliciously replaced. Thus, the parent device 220 can identify the ECU 201 (communication node) that has been maliciously replaced by collecting the authentication results. In other words, the child device 202 detects by itself the ECU 201 that has been maliciously replaced, which permits the parent device 220 to identify the maliciously replaced ECU 201.

All examples and conditional language provided herein are intended for the pedagogical purpose of aiding the reader in understanding the invention and the concepts contributed by the inventor to further the art, and are not to be construed as limitations to such specifically recited examples and conditions, nor does the organization of such examples in the specification related to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication relay that is situated between a corresponding communication node and a bus in a communication network in which a plurality of communication nodes mutually perform a data communication through the bus, the communication relay comprising:
 a memory configured to store therein pieces of identification information that are likely to be included in message data transmitted by the corresponding communication node, each of pieces of the identification information identifying a type of the message data transmitted by the corresponding communication node;
 a processor configured
  to perform first authentication processing between the communication relay and a manager that is connected to the bus, the manager managing the plurality of communication nodes and a plurality of communication relays each corresponding to a respective one of the plurality of communication nodes, and
  to perform second authentication processing according to a result of comparing identification information, which is included in message data received from the corresponding communication node and which identifies a type of the message data received from the corresponding communication node, with the pieces of identification information stored in the memory; and
 a transceiver configured to report, to the manager, a result of the second authentication processing when the first authentication processing has been successful.

2. The communication relay according to claim 1, wherein
 when the manager and the communication relay are powered on, the processor performs the first authentication processing between the communication relay and the manager, and
 when the first authentication processing has been successful and when the second authentication processing has been unsuccessful, the transceiver reports a result of the second authentication processing.

3. The communication relay according to claim 1, wherein
 the first authentication processing between the communication relay and the manager is an authentication processing in a challenge and response method.

4. A non-transitory computer-readable recording medium having stored therein a communication relay program for causing a communication relay to execute a process, wherein the communication relay is situated between a corresponding communication node and a bus in a communication network in which a plurality of communication nodes mutually perform a data communication through the bus, the process comprising:
 performing first authentication processing between the communication relay and a manager that is connected to the bus, the manager managing the plurality of communication nodes and a plurality of communication relays each corresponding to a respective one of the plurality of communication nodes;

storing in a memory, pieces of identification information that are likely to be included in message data transmitted by the corresponding communication node, each of pieces of the identification information identifying a type of the message data transmitted by the corresponding communication node;

performing second authentication processing according to a result of comparing identification information, which is included in message data received from the corresponding communication node and which identifies a type of the message data received from the corresponding communication node, with the pieces of identification information stored in the memory; and reporting a result of the second authentication processing to the manager when the first authentication processing has been successful.

5. The non-transitory computer-readable recording medium according to claim 4, comprising:

when the manager and the communication relay are powered on, performing authentication processing between the communication relay and the manager; and when the first authentication processing has been successful and when the second authentication processing has been unsuccessful, reporting a result of the second authentication processing to the management device.

6. The non-transitory computer-readable recording medium according to claim 4, wherein the performing of the first authentication processing is performing authentication processing between the communication relay and the manager by use of an authentication processing in a challenge and response method.

7. A communication relay method comprising:

performing, by a communication relay, first authentication processing between the communication relay and a manager that is connected to a bus, the communication relay being situated between a corresponding communication node and the bus in a communication network in which a plurality of communication nodes mutually perform a data communication through the bus, the manager managing the plurality of communication nodes and a plurality of communication relays each corresponding to a respective one of the plurality of communication nodes;

storing, in a memory, by the communication relay, pieces of identification information that are likely to be included in message data transmitted by the corresponding communication node, each of pieces of the identification information identifying a type of the message data transmitted by the corresponding communication node;

performing, by the communication relay, second authentication processing according to a result of comparing identification information, which is included in message data received from the corresponding communication node and which identifies a type of the message data received from the corresponding communication node, with the pieces of identification information stored in the memory; and reporting, by the communication relay device, a result of the second authentication processing to the manager when the first authentication processing has been successful.

8. The communication relay method according to claim 7, comprising:

when the manager and the communication relay are powered on, performing authentication processing between the communication relay and the manager; and when the first authentication processing has been successful and when the second authentication processing has been unsuccessful, reporting a result of the second authentication processing to the management device.

9. The communication relay method according to claim 7, wherein the performing of the first authentication processing is performing authentication processing between the communication relay and the manager by use of an authentication processing in a challenge and response method.

10. A system comprising:

a communication relay configured to be situated between a corresponding communication node and a bus in a communication network in which a plurality of communication nodes mutually perform a data communication through the bus; and a manager connected to the bus and configured to manage the plurality of communication nodes and a plurality of communication relays each corresponding to one of the plurality of communication nodes, wherein the communication relay performs first authentication processing between the communication relay and the manager, stores, in a memory, pieces of identification information that are likely to be included in message data transmitted by the corresponding communication node, each of pieces of the identification information identifying a type of the message data transmitted by the corresponding communication node, performs second authentication processing according to a result of comparing identification information, which is included in message data received from the corresponding communication node and which identifies a type of the message data received from the corresponding communication node, with the pieces of identification information stored in the memory, and reports a result of the second authentication processing to the manager when the first authentication processing has been successful, wherein the manager determines, from among the plurality of communication nodes, a communication node whose result of the second authentication processing is not successful to be a maliciously replaced communication node.

* * * * *